United States Patent [19]
Rhoades et al.

[11] Patent Number: 5,189,377
[45] Date of Patent: Feb. 23, 1993

[54] METHOD AND APPARATUS FOR CO-ORDINATE MEASURING USING A CAPACITANCE PROBE

[75] Inventors: Lawrence J. Rhoades, Pittsburgh; Ralph L. Resnick, Slickville; John R. Rose, Pittsburgh, all of Pa.

[73] Assignee: Extrude Hone Corporation, Irwin, Pa.

[21] Appl. No.: 577,021

[22] Filed: Sep. 4, 1990

[51] Int. Cl.[5] .................. G01R 29/12; G01R 27/26
[52] U.S. Cl. ........................... 324/662; 324/457; 324/663; 324/684
[58] Field of Search ............ 324/662, 663, 684, 687, 324/457, 458, 671

[56] References Cited

U.S. PATENT DOCUMENTS

| | | | |
|---|---|---|---|
| Re. 32,457 | 7/1987 | Matey | 324/662 |
| 2,935,681 | 5/1960 | Anderson. | |
| 3,263,167 | 7/1966 | Foster et al. | 324/662 |
| 3,805,250 | 4/1974 | Abbe | 324/662 |
| 4,384,332 | 5/1983 | McMurtry. | |
| 4,498,043 | 2/1985 | Heathcote et al. | |
| 4,764,722 | 8/1988 | Coughlin et al. | |
| 4,806,848 | 2/1989 | Deiners | 324/662 |
| 4,814,691 | 3/1989 | Garbini | 324/661 |
| 4,816,744 | 3/1989 | Papurt. | |
| 4,931,887 | 6/1990 | Hedge et al. | 324/662 |
| 5,065,103 | 11/1991 | Slinkman et al. | 324/458 |

FOREIGN PATENT DOCUMENTS 2100441 12/1982 Fed. Rep. of Germany.

OTHER PUBLICATIONS

Scanning Capacitance Microscopy Bugg et al. IOP Publishing Ltd. 1988.

Primary Examiner—Jack B. Harvey
Assistant Examiner—Maura K. Regan
Attorney, Agent, or Firm—Waldron & Associates

[57] ABSTRACT

The surface parameters and characteristics of a conductive workpiece are determined by applying a voltage between the workpiece and a capacitance probe having proximity sensing capabilities, and moving the probe in two or three co-ordinate axes relative to the workpiece while measuring the capacitance between the probe and workpiece, and controlling the probe velocity and/or direction within a stand-off band adjacent to the workpiece as a function of the capacitance value measured for purposes of effecting significant real time process controls, and determining the workpiece surface parameters as a function of the probe movement and capacitance measured.

19 Claims, 3 Drawing Sheets

METHOD AND APPARATUS FOR CO-ORDINATE MEASURING USING A CAPACITANCE PROBE

BACKGROUND OF THE INVENTION

1. Field of the Invention

The present invention relates to a new and improved method and apparatus for measuring conductive workpiece surface characteristics such as dimensions, contour and the like, utilizing a conductive capacitance probe having a high degree of sensitivity and resolution as well as proximity sensing capabilities, which is moved with respect to the workpiece without need for the probe to contact the workpiece. In addition, the probe movement; i.e., velocity and/or direction within a stand-off band, are at least in part, controlled by the capacitance being measured by the probe, thus relying on the probe's proximity sensing capabilities to control probe movement to provide a number of real time process controls to significantly speed any measurement procedure.

2. Summary of the Prior Art

Two and three dimensional co-ordinate measuring machines are well known in the art, which typically comprise a head supported for two or three-dimensional motion relative to a fixed structure. The movable head supports a stylus probe which is generally in the form of a straight rod with a small contact ball at the tip disposed away from the head. The machine includes a plurality of drive means for moving the head and, accordingly, the probe in two or three coordinate axes, and a monitoring means for instantly monitoring and recording the position of the probe with reference to the co-ordinate axes. Means is also provided for generating a signal when the probe comes into contact with the workpiece, which will stop the driving motion of the probe where its position is then recorded. Co-ordinate measurements of a workpiece mounted to the fixed structure are determined by moving the head in one or more directions and reading the co-ordinate position of the probe relative to a given datum when the probe contacts the workpiece. State of the art co-ordinate measuring machines are capable of monitoring and recording probe positions to an accuracy of 0.00025 mm (0.00001 inch).

Because the co-ordinate measuring machines of the prior art rely on physical contact to measure the co-ordinate positions of the workpiece surfaces, the operating sequence tends to be rather prolonged and time consuming. In addition, it is generally known that contact probes are expensive to manufacture and, due to the physical contact, are subject to wear and corrosion. It should be apparent that even a small amount of wear or corrosion can introduce significant errors to the machine's accuracy capabilities to 0.0005 mm.

In addition to the above, inherent difficulties and inaccuracies are built into the prior art system and techniques for determining a contact position which tend to detract from the accuracy capabilities of the co-ordinate measuring machine as whole. For example, setting the probe to an accurate zero starting position cannot be effected rapidly, as the probe must be brought into contact with the workpiece, and then carefully adjusted so that contact is maintained without any probe pressure against the workpiece, or any bending or deflection of the probe. More importantly, however, it is known that a mere light touch contact of the probe with the workpiece, without more, is not normally sufficient to activate the stop signal. Rather, the stop signal is effected only after the probe has been bent, deflected or in some way disturbed. While it would be desirable to stop the motion of the head at the exact instant of probe contact, the contact signal does not normally occur immediately upon contact, and the drive mechanism cannot be stopped instantly upon receipt of the stop signal. Rather, the head continues to move by a minute amount relative to the probe tip before the stop signal can be effected, with an even further minute movement before the stop signal effects a complete stop of the drive mechanism. As a result, the probe stylus is bent or deflected under the operating force necessary to generate and transmit the stop signal, as well as overcome the momentum of the drive means after the stop signal has been transmitted.

Since such probe bending or deflection is inherent, it is normally taken into account in the measuring process. The amount of relative movement between the head and the probe tip is referred to as the "bending allowance", and is deducted from the distance measured by the machine. To measure from a surface where such deflection has already occurred, a starting bending allowance must again be deducted from the distance measured, or else the probe re-set to a proper zero starting point. Accordingly, consecutive measurements of different surface dimensions can be a relatively prolonged procedure.

To be reasonably valid, any such "bending allowance" must first be based on probe movement at a uniform velocity, regardless of the dimension being measured, and secondly any bending force must be applied perpendicularly to the elongated orientation of the stylus probe. Therefore, while it would be desirable to move the probe at different velocities depending on the magnitude of the dimension being measured, the probe velocity must be fixed to the value used in establishing the bending allowance. Secondly, it should be apparent that any probe contact with a workpiece surface inclined at an angle to the direction of the probe movement will cause a lateral bending force which can deviate from the pre-set bending allowance. It should be further apparent that the application of any bending force vector which would tend to bend or deflect the probe towards the head, could cause the probe to be damaged.

It is generally known, however, that even at constant velocities and perpendicular bending forces, the forces necessary to effect a given bend or deflection, are not the same for different directions of application of the bending force. Therefore, application of a given bending allowance, regardless of the direction of the force, will inherently induce errors into the measurement determination.

While moving the probe at a relatively slow velocity will tend to minimize errors by minimizing probe bending or deflection, the inaccuracy is not completely eliminated but rather reduced in magnitude; and slowing of the fixed probe velocity will merely prolong the overall operation time, adversely affecting the equipment's efficiency.

To overcome the above problem, many different types of stylus mounting systems have been devised to permit stylus deflection without bending, which further include calibrating means for determining the extent of deflection through a variety of complex probe mounting systems. These mounting systems are not only intricate, complex and costly, but still do not achieve the degree of exacting measurements desired, and can often be damaged or knocked out of adjustment by the probe's impact with a workpiece surface.

There are a number of different types of contact probes which have been designed to overcome the bending and deflection problem such as radio frequency probes, analog touch probes, LVDT probes and even others. Radio frequency probes, for example, attenuate a radio frequency signal upon contact with a metallic workpiece. While these probes are capable of transmitting a stop signal immediately upon contact with the workpiece without any probe bending or deflection, the drive mechanism cannot be stopped immediately upon receipt of the stop signal, as momentum of the drive means must still be overcome. In addition, such arrangements are prone to electromagnetic noise interference with the radiated radio frequency signal which can lead to false indications of probe contact. Analog touch probes, sometimes referred to as "touch-fire" probes, rely specifically on the degree of pivoting of the probe upon contact with the workpiece to measure the workpiece surface and are capable of a direct contact tracing of a workpiece surface. To obtain reliable data, however, analog touch probes must be moved at a relatively slow speed which severely limits the number of measured reference points that can be achieved, and are, therefore, not practical for commercial applications. LVDT probes, like analog touch probes, rely on a constant deflection of the probe while the probe is moved very slowly along the surface of the workpiece. In addition to being very slow, these probes are subject to a significant degree of frictional wear.

It should further be apparent that any type of contact probe in motion, is "blind", and therefore, when moving towards a workpiece surface, has no way of sensing or "knowing" that it is approaching a surface or that contact is imminent. Therefore, the contact probe will make contact with the workpiece surface as the probe is moving at its fixed constant velocity. As noted above, contact at a fixed constant velocity is, nevertheless, essential so that a reasonably valid bending allowance can be subtracted from the measured distance of travel. Therefore, it is not only essential that the probe velocity be constant, but it must also be relatively modest so that meaningful bending allowances can be applied, and to further assure that the probe does not contact the workpiece with sufficient velocity to cause any damage to the probe, or any misalignment in the probe mounting structure and deflection measuring apparatus. While it would be advantageous with respect to real time controls to permit the probe to move at a higher velocity, particularly when traversing relatively long distances, it is apparent that anything more than a modest velocity cannot be utilized.

While prior art co-ordinate measuring apparatus and techniques can and have been applied to the measuring of workpiece surface contour to determine a profile line, it should be apparent that since probe contact and deflection are required to record a surface position, that the procedure whereby the probe will "follow" or "trace" the surface is rather cumbersome. To effect such a tracing movement, the probe must be programmed to move along first and second mutually perpendicular axes in a series of steps to alternately make and break contact with the workpiece, thus defining the profile by a series of contact points. The closer the contact points are, the more accurate the determined profile will be. If there is a considerable difference in the length of movement between the two axes, as a result of a very shallow or very steep workpiece surface incline, the contact points may become so spaced that resolution is seriously affected. It should be further apparent that the time necessary to perform a reasonably accurate complete profile can become exceptionally long. In addition, this technique is necessarily based upon probe contact which is not perpendicular to the direction of probe movement. Therefore, there may be inherent inaccuracies in the bending allowances applied.

As distinguished from contact probes discussed above, non-contacting capacitance probes have been utilized in prior art techniques for measuring conductive workpiece surface dimensions and characteristics. Such probes have established a highly useful role in industrial manufacturing and in the machine tool industry, in particular, for the characterization of surface properties. As the art is now aware, these sensors are based on the employment of a variable capacitance, due to the coupling of the sensor with a surface to be evaluated, by techniques such as controlling the rate of an oscillator circuit, so that the frequency of the oscillator is directly determined and altered as a function of surface characteristics.

Most of the prior art practices utilizing capacitance sensing probes are based on the use of probes that incorporate a plurality of capacitor sensors so that the differences in capacitance as measured by the various sensors is a function of the workpiece surface characteristic sought. For example, U.K. Patent No. 2,100,441, issued to Wolfendale, teaches a method of determining the contour of an unknown conductive surface or a diameter of a bore utilizing a non-contacting probe, which comprises a probe having a plurality of capacitor sensors positioned at or near the probe tip. According to one technique taught in the patent, a probe with a plurality of side-by-side sensors is held stationary at a given spaced relationship from the unknown surface; i.e., at a predetermined stand-off distance, and the capacitance values of the various capacitor elements are monitored. A variation in the capacitance readings indicates a variation in spacing between the sensors and the workpiece, thereby indication the workpiece surface contour. According to another technique taught in the patent, a general purpose sensor, having a plurality of sensor elements equally spaced abound the tip, is moved generally parallel to the workpiece surface while keeping the capacitance constant. The probe therefore "traces" the workpiece at a given "null point" or stand-off distance from the workpiece so that its path, less the stand-off distance, is an accurate measurement of the workpiece surface profile.

U.S. Pat. No. 4,816,744, issued to Papurt, et al., teaches a process and apparatus for measuring an inside dimension of a workpiece, such as a bore diameter, by positioning the probe at a given null point adjacent to one workpiece surface, and then moving the probe to an equal null point adjacent to the other workpiece surface, e.g. diametrically across a bore, and measuring the distance of probe movement with a laser interferometer. The measured distance or diameter is determined to be equal to the distance traveled by the probe plus two times the null point distance; i.e., the distance the probe center is spaced from the workpiece surface at the null point positions. While the probe utilized in this invention comprises a single capacitor sensor, and is therefore more amenable to general purpose applications, the technique is not universally applicable to general co-ordinate measuring techniques, and requires that the probe be started and stopped at the predetermined null point so that the start and stop stand-off positions are known. Additionally, starting and stopping the probe at a given null point is time consuming as the probe must be moved slowly and adjusted in incremental steps to achieve the exact null point reading, and therefore, does not provide any meaningful real time process controls.

All prior art workpiece measuring processes utilizing non-contacting capacitance probes rely on the null point technique regardless of the nature of the of parameters sought. In measuring distance or locations of workpiece surfaces, it has always been the practice that to avoid contact, the probe must be started, stopped or positioned at a null point with reference to the surface in interest as indicated by the correlating null point capacitance, so that the distance from the probe to the workpiece surface is know and can be considered in the final measurement determination. Even the prior art surface "tracing" techniques, as discussed above with reference to the Wolfendale patent, rely on such a null point capacitance to control the probe motion. Specifically, the probe is positioned and started at a starting null point where its displacement from the workpiece surface is known. Then the probe is moved generally parallel to the workpiece surface to be traced in a continuing series of incremental movements, and the change in capacitance at the end of each minute movement monitored. If the capacitance increases, the probe must be moved towards to workpiece until the null point capacitance is reached. If the capacitance increases, the probe is moved away from the workpiece surface until the null point capacitance is reached. In either situation, the probe position is recorded only after it has been adjusted to the exact null point. Even though the individual adjustments can done rather rapidly with analog or digital computations, it still requires a very large number of continuing adjustment or stepping of the probe position towards or away from the workpiece to locate the null point following each incremental lateral movement. It should be apparent, therefore, that this technique in not significantly different from the above described procedure of making and breaking contact with contact probes. Therefore, despite the use of analog or digital controls, the need to incrementally stop the probe movement to adjust it to the null point, is still quite time consuming.

SUMMARY OF THE INVENTION

According to the present invention, there is provided a new and improved method and apparatus for measuring workpiece dimensions, surface characteristics, surface contour and the like, utilizing a conductive capacitance probe which has proximity sensing capabilities; i.e., the capability to "see" the adjacent workpiece surface including surface irregularities spaced from the probe. Pursuant to this invention, the probe is moved with respect to the stationary workpiece, or vice versa, without the need for the probe to ever contact the workpiece surface, and whereby the workpiece co-ordinates are determined as a function of the recorded probe movement as well as the corresponding recorded capacitance. By this practice, the movement parameters of the probe; i.e., velocity and/or direction within a stand-off band, are made to be functions of the probe's proximity sensing capabilities as determined by the capacitance measured by the probe, for the purpose of providing significant real time process controls. Pursuant to the process of this invention, therefore, the proximity sensing capabilities of the probe, in a closed loop feed back control to the drive mechanism, will permit measurements to be taken far quicker than possible with prior art techniques, and in some embodiments virtually taken "on the fly" with out stopping or stepping to locate null points.

In its most basic application, the apparatus of this invention involves the use of an apparatus such as a machine tool that can cause a controlled relative motion between a probe and a workpiece such as a milling machine, lathe or the like. For a more universal application, the apparatus for causing the relative motion ideally comprises a, more or less, conventional, state of the art co-ordinate measuring machine, of either the two or three-dimensional type, having a single sensor element capacitance probe, with means for monitoring and recording the path of travel of the probe sensor. Pursuant to this invention, a processor-controller is included as part of a closed loop feed back to continually receive and process the capacitance measurement between the probe and the workpiece, and to control the drive means for moving the probe with reference to two or three co-ordinate axes responsive to the capacitance measurements. A second data processor is included for computing the workpiece surface parameters sought as a function of the recorded path of travel of the probe and corrected by the variable distance the probe was spaced from the workpiece as indicated by the recorded capacitance. Unlike the prior art co-ordinate measuring machines, the probe need not contact the workpiece surface, but rather the processor-controller is programmed to move the probe in any programmed fashion responsive to the probe's proximity sensing capabilities as indicated by the measured changes in capacitance, to perform a variety of different types of measurements.

In accordance with this invention, two significantly different but related real time process control techniques can be utilized separately or in combination to very quickly measure various workpiece surface characteristics, which controls are based on the probe's proximity sensing capabilities. Both of these techniques are based on controlling the motion of the probe; i.e., velocity and direction, in direct or indirect proportion to the measured capacitance, both of which will allow the probe motion velocity to be maximized to the extent possible with the drive mechanism.

Since the capacitance probe can measure any number of workpiece surface conditions without the probe ever contacting the workpiece, it should be apparent that the probe mounting can be significantly simplified without the need for any deflection monitoring systems, without any risk of damaging the probe, and without any probe surface ware. Because the probe of this invention can "see" the workpiece and is, therefore, capable of determining the location of an adjacent workpiece as well as changes in surface conditions before the probe reaches those changed surface conditions, the process and apparatus of this invention is far more versatile than conventional prior art co-ordinate measuring machines based on probe contact. As contrasted to prior art capacitance probe measuring processes, this invention provides considerably more versatility, not only in being combined with a co-ordinate measuring machine, but more importantly, by providing more accurate and far more rapid techniques for measuring workpiece dimensions and characteristics, thus providing a real time process control capabilities not possible with any prior art measurement processes, whether contact or capacitance.

DETAILED DESCRIPTION OF THE INVENTION

In the present invention, a single element capacitor probe is provided in combination with a co-ordinate measuring machine which can be employed for a diversity of applications in the field of conductive workpiece measurement, particularly in measuring conformity to manufacturing tolerances. This invention has the capability of performing all measurement procedures which could previously be performed with prior art co-ordinate measuring machines, but with a significantly higher degree of resolution and accuracy, and more importantly, with significant real time controls.

The single element sensor of this invention is configured for capacitance properties permitting a variety of non-contact based measurements from which a number of important determinations can be made, which not only include measurement of workpiece surface parameters such as dimensions and contour, but also measurements of approach and proximity which can be employed as real time controls. The capacitor sensing element of this invention operates in a highly sensitive and high speed manner suitable for real time commercial applications via analog or digital electronic control techniques.

All the operations in the present invention are based on the primary relationship $$C = KA/t$$

where C is capacitance, K is the effective dielectric constant, A is the area of the coupling interface, and t is the distance between plates; i.e., probe sensor and workpiece.

In the context of the present invention, K and A are effectively fixed values, so that C is seen to be inversely proportional to t. It should be apparent that as t grows smaller and smaller, the magnitude of the change in C grows larger and larger, so that at the stage of close approach, even very small and gradual changes in distance, t, produce quite substantial signals for control purposes. This will effect and increase in sensitivity and resolution at that point in the process where increased sensitivity and resolution are essential.

In the present invention, the features and functions are attained by moving a single element capacitor sensor with respect to a stationary workpiece, or vice versa, while continuously monitoring and recording the probe's path of travel as well as continuously monitoring and recording the corresponding capacitance between the sensor element and the workpiece, and determining the workpiece parameters as a function of both the recorded probe path of travel as well as the recorded capacitance corresponding thereto, thereby avoiding any need for nulling the probe with respect to the workpiece. By utilizing this measurement technique, it is possible to control the relative motion between the two components so that the probe's relative velocity and/or direction of movement within a stand-off band is a functions of the monitored capacitance. Resolution of the capacitance measurements taken will be dependent on the size of the sensor element and its precision to geometric configuration. Some of the parameters of interest in the present process may require sensing and data evaluation at relatively high speeds. Since only a single sensor element is utilized, however, the computational load on the control system should not be particularly demanding. While it should be appreciated that either the probe or the workpiece can be the element in motion, the most common applications will involve the movement of the probe with respect to a stationary workpiece, and therefore, further descriptions below will be limited to applications where the probe is in motion for the purpose of simplifying those descriptions.

Pursuant to the practices of this invention, there are two basically different techniques for measuring workpiece surface parameters with real time controls which can be used separately or in combination, depending primarily on the task at hand.

According to one technique, the velocity of the probe movement is made to be a function of the measured capacitance. In this application, the probe is moved in a path of travel in proximity to the workpiece, while measuring the changing capacitance between the probe and workpiece, with capacitance changes indicating variations in the gap between the probe and the workpiece, approaching changes in surface characteristics of the workpiece, or both. By this technique, the velocity of the probe motion is a function of the capacitance being measured, so that the probe velocity is either constant, increasing, decreasing or stopped in accordance with the measured capacitance values. At any given time, however, the probe velocity is at a maximum limit consistent with the necessity to prevent the probe from impacting with or overriding the workpiece. Since the probe has the ability to "see" the workpiece; i.e., has proximity sensing capabilities, its motion velocity towards or transverse to the workpiece surface can be controlled to take advantage of any significant spacings where the probe is not in peril of impacting with the workpiece or moving therepast to provide meaningless data, to thereby significantly speed the motion of the probe as a real time process control. Therefore, when the probe in motion is not in danger of impacting with or overriding the workpiece, its velocity is maximized. As the probe approaches a workpiece surface or edge, its velocity is automatically reduced in proportion to its proximity to the surface or edge by virtue of the fact that the capacitance will be changing in proportion to the probe's proximity to the surface or edge. As the distance between the probe and surface or edge grows progressively smaller, the probe velocity progressively slows to permit more exacting control of the probe motion relative to the workpiece where such slow and exacting control is essential.

Pursuant to the other technique, the probe is positioned, or put in motion, within a band of variance adjacent to the workpiece surface thereby eliminating any need to position the probe at any exacting null point. For example, to position the probe at any starting or end point, the probe is not brought to any specific null point, but rather brought near to the surface within a band of acceptable sensitivity. The variable stand-off distance between the probe and workpiece can be readily determined by the measured capacitance. Therefore, positioning the probe at an exact null point is not really necessary. As a result, the probe can be placed at a starting position, or stopped at an end position, much more quickly as there is no need for the fine tuning or careful stepping movements to locate the exact null point.

Of more importance, however, is the fact that this technique will provide very significant real time process controls to surface following measurements such as determining a workpiece surface contour by tracing the surface. By this technique, the direction of the probe's motion, or path of travel, is dictated by the capacitance being continually measured, so that probe will have a continuous, uninterrupted motion within a band of variance parallel to the workpiece surface. Pursuant to this technique, the probe does not in fact "tracing" the exact workpiece surface profile pursuant to prior art practices, but rather provides just a general tracing within a given stand-off band. The exact contour of the workpiece surface, however, can be readily computed by calculating the corresponding stand-off distance which is a function of the probe path of travel corrected by the corresponding capacitance. By this technique, therefore, the probe will not be moved from one null point to the next in a continuing series of mutually perpendicular minute movements, but rather will be put in a continuous, non-stop motion, and only its direction of motion will be adjusted as necessary to keep the motion within the sensitivity band. Accordingly, the probe will be able to follow a workpiece surface much more quickly since each minute lateral motion need not be corrected by a perpendicular motion to find the null point, but rather each minute motion is corrected only to the extent of keeping the motion within the desired band. The differences and benefits of this technique are explained in greater detail below.

Here again the probe's motion is based on its proximity sensing capabilities, as the probe can "see" the nearest workpiece surface, and accordingly be programmed to rapidly follow or "trace" the workpiece surface contour within a given stand-off band. In more complex applications, both the velocity and direction can be varied by providing suitable algorithms to control both motion parameters.

This second technique is based on the measurement of the capacitance to maintain the proximity of the continuously moving probe within a band defining an acceptable sensitivity range. Obviously, the stand-off distance cannot be of any value as the resolution and sensitivity will diminish as the stand-off increased. Therefore, the stand-off distance permitted must be maintained within a band that will provide an acceptable degree of resolution and sensitivity, as will be discussed below.

The above described technique will eliminate the need for exacting positioning of the probe which will thereby permit more rapid and less exacting probe movement and eliminate any need for time consuming probe adjustment to stop and step the probe to any exact null point position. Application of this technique in practice will further differ from prior art practice in that any workpiece surface parameter sought will not only be a function of the probe position, but also the capacitance at that position. The combination of this technique with the velocity control technique will provide even greater improvements in real time controls by permitting very accurate workpiece surface measurements while the probe in "on the fly", without any need to stop or step the probe for purpose of recording probe position.

It should be apparent that all of the above measurement techniques are based on the proximity sensing capabilities of the capacitance probe. Proximity sensing is a function of the high level of sensitivity of capacitance as an inverse of the distance between capacitor plates, in this case, between the probe sensor and the workpiece. As the probe of the present invention approaches a workpiece or workpiece surface, which acts as an opposed capacitance plate in relation to the probe sensor, changes in capacitance become detectable at substantial distances, measurable in a number of inches, and becomes progressively more sensitive to changes in distance as the absolute distance grows smaller. Therefore, the closer the approach, the more exacting the control becomes. At greater distances, where only coarse control is desired, the lack of sensitivity and resolution is of little importance, and, therefore, gross controls can be effected as real time process controls. By evaluating the capacitive coupling, therefore, between the workpiece and the probe, as the reactive distance decreases, the capacitance change is a function of the distance between the two, and the values obtained can be employed as a closed loop feed back control system to direct the approach to the workpiece, or at least the nearest workpiece surface, with a high degree of precision and accuracy. The results will be very highly reproducible, so that a very safe and effective control of such operation can be achieved.

Figure 1:
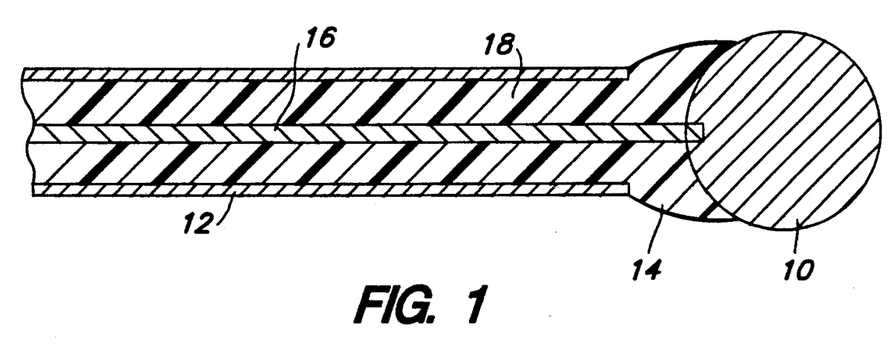
FIG. 1 is a is an enlarged cross-section of one embodiment of the capacitance probe of this invention.

With regard to the mechanical hardware of the apparatus of this invention, any conventional machine tool which causes a relative motion between a tool and workpiece can be utilized. In applications where one wishes to determine whether a machined surface was machined to specifications tolerances, it may be particularly advantageous to utilize the very same machine tool which machined the workpiece by mounting the probe in place of the cutting tool and then effecting the relative motion between the probe and workpiece to determine the machined surface parameters according to the practice of this invention. As a general purpose apparatus, however, it would be more ideal to utilize a co-ordinate measuring machine. Two and three dimensional co-ordinate measuring machines as can be utilized in this invention are well known in the art, which typically comprise a head supported for two or three-dimensional motion relative to a fixed structure. The movable head supports a capacitance stylus probe as shown in FIG. 1 for example. The machine includes a plurality of drive means for moving the head, and accordingly the probe, in two or three coordinate axes, and a monitoring means for instantly monitoring and continuously recording the position of the probe with reference to the co-ordinate axes. As previously noted, state of the art co-ordinate measuring machines are capable of monitoring and recording such probe positions to an accuracy of 0.00025 mm (0.00001 inch). The mechanical features of co-ordinate measuring machines are well known in the art, as exemplified by those machines manufactured and sold by Renishaw Electrical Limited, of Gloucestershire, England, and, therefore, need not be further described here.

Contrary to prior art hardware, however, the probes motion is not manually selected or pre-programmed in the process of this invention, but rather the drive means for moving the head is controlled by a processor-controller within the closed loop feed back which directs the various drive means in response to the measured capacitance and pursuant to a algorithm programmed into the processor-controller. In addition, a processor-computer is included for determining the workpiece surface parameters as a function of the probe's recorded path of travel and the recorded capacitance values corresponding thereto.

Reference to FIG. 1 will illustrate one embodiment of the capacitance probe of this invention useful for general purpose applications. The probe shown in FIG. 1 comprises an elongated stylus tube 12 with a substantially spherical metallic sensor 10 at the tip. The stylus tube 12 is made of a rigid conductive metal, such as stainless steel, with the capacitor sensor 10 also made of a conductive metal, preferably having a highly conductive, non-corrosive, surface plating, such as gold. The sensor 10 is bonded to the stylus tube 12 by a non-conductive bonding material 14, such as an epoxy resin, so that the sensor 10 is electrically insulated from the stylus 12. A stiff conductive wire 16 is conductively secured to sensor 10, and extends therefrom through the center of stylus tube 12, with an insulative material 18, such as epoxy, uniformly disposed around wire 16 to insulate and space it uniformly from the cylindrical surfaces of tubular stylus 12. In operation, the conductive stylus tube 12 is grounded so that it will shield wire 16 from any stray capacitance or environmental influences. For most practical applications, the sensor should have a diameter of about 1 to 2 mm, with the stylus tube ideally being a 0.032-inch stainless steel tube having a 0.020 in internal diameter, housing a 0.010 in wire. The overall length of the probe will normally be from 4 to 8 in. While the substantially spherical configuration of the sensor 10 is ideal for many applications, and is a good general purpose sensor, it should be apparent that the sensor can be of various sizes and alternate configurations as may be beneficial for any specific purpose use. For example, the sensor may be in to form of a pointed tip if exceptionally small workpieces are being measured, or alternately in the form of a flat disk for measuring the degree of flatness of flat workpiece surfaces, and so on.

While it was stated above that the primary capacitance relationship upon which this invention is based is the is the basic relationship $$C = KA/t$$

a more accurate expression of this relationship when using a spherical sensor as shown in FIG. 1 is $$C = C_o - A^{Kt/B}$$

where $C_o$ is the environmental free air capacitance and B is a constant value in proportion to the diameter of the sensor. Therefore when the probe is a distance t from a a workpiece surface, its distance is determined by the relationship $$t = B \ln(C_o - C/A) \text{ or}$$

$$t = B \ln(C_o - C) - B \ln A$$

A typical value for B can be determined by taking two points on a calibration curve; e.g.,

| 1 mil | $C_o - C = 300$ |
| 3 mil | $C_o - C = 194$ |

Therefore,

| $1 = B \ln(300) - B \ln(A)$ |
| $3 = B \ln(194) - B \ln(A)$ and |
| $2 = B \ln(194/300) - B \ln(A)$. |

For a sensor diameter of 1.295 mm (0.051 inch) the observed B was 4.59 mil, and for a diameter of 1.016 mm (0.040 inch) the observed B was 3.59 mil.

Figure 2:
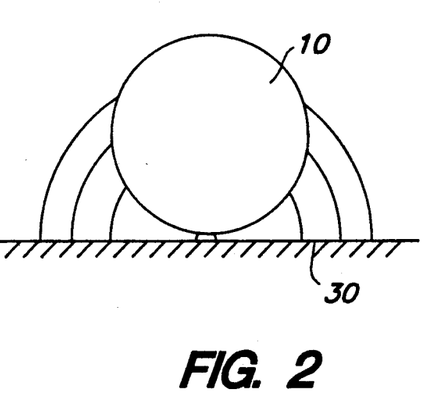
FIGS. 2, 3, 4 and 5 are graphic representations of four different capacitance field distributions of the capacitance probe adjacent to workpiece surfaces having differing characteristics or edges which the probe sensor can "see" and which will dictate the motion of the probe.

Reference to FIGS. 2, 3, 4 and 5 will schematically illustrate the probe sensor in the proximity of four different workpiece surface conditions as may be utilized to control the motion of the probe. The capacitance between the sensor 10 and workpiece 30 are depicted as lines extending between the sensor 10 and workpiece surfaces. In FIG. 2, the sensor is shown to be closely spaced from a flat workpiece surface 30 without any other surfaces or receding edges significantly effecting the capacitance. Here, the most significant capacitance value is that which is depicted by the closely spaced straight lines extending from the sensor 10 to the workpiece at their points of closest proximity. The fringe capacitance, depicted by the curved lines, does not at this point detect the near presence of any change in surface features. Therefore, if the probe depicted in FIG. 2 is moving in a straight line parallel to the workpiece surface 30 at a velocity inversely or directly proportional to the measured capacitance, FIG. 2 could be taken to represent the probe in motion at or near its maximum velocity, somewhere between the two endpoints of the workpiece surface being measured.

Figure 3:
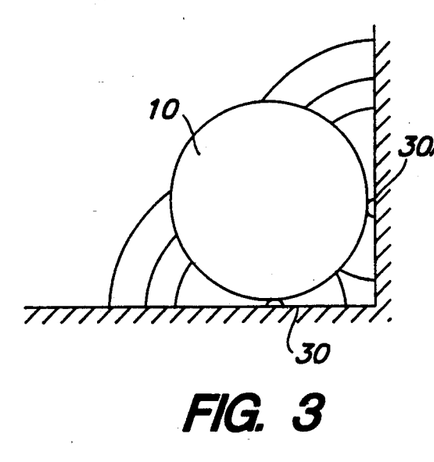

FIG. 3 is similar to FIG. 2, except that it represents the position of the probe sensor at an end-point adjacent to an inside corner. As the probe sensor approaches this inside adjacent surface 30A, the probe velocity will be slowed in proportion to the increasing capacitance, and finally stopped, or direction of motion changed, when a predetermined capacitance is reached, as represented by the total capacitance measured between the sensor and the two workpiece surfaces. As should be apparent by contrasting FIGS. 2 and 3, the capacitance measured in the position depicted in FIG. 3 will be nearly double the value measured in the position depicted in FIG. 2.

Figure 4:
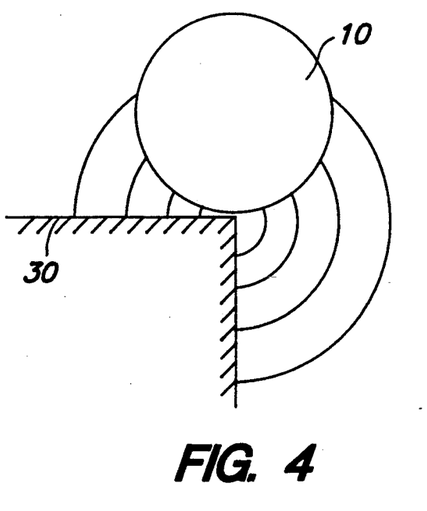

FIG. 4 is substantially the same as FIG. 3 except that it illustrates the probe as positioned at an end-point over an outside corner. This figure could be representative of a situation where the probe has moved along the surface 30 parallel thereto, with a velocity in direct proportion to the measured capacitance, with FIG. 2 again depicting the probe in motion at or near its maximum velocity, somewhere between the two end-points, substantially as described above. In this application, however, the probe's velocity and stop or change direction position must be controlled in direct proportion to the measured capacitance, as the capacitance will decrease as the probe approaches to outside corner. As the sensor approaches the outside corner as shown in FIG. 4, the probe motion is slowed in proportion to the decreasing measured capacitance; i.e., the decreasing capacitance caused by the approaching workpiece edge, and eventually stopped or turned at the predetermined end point as shown in FIG. 4.

Figure 5:
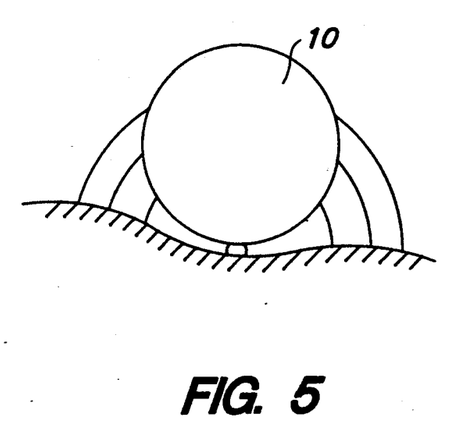

FIG. 5 is representative of the probe in motion adjacent to a non-flat workpiece surface which could depict a situation where the probe is programmed to "trace" the workpiece surface for the purpose of determining its contour or profile.

Figure 6:
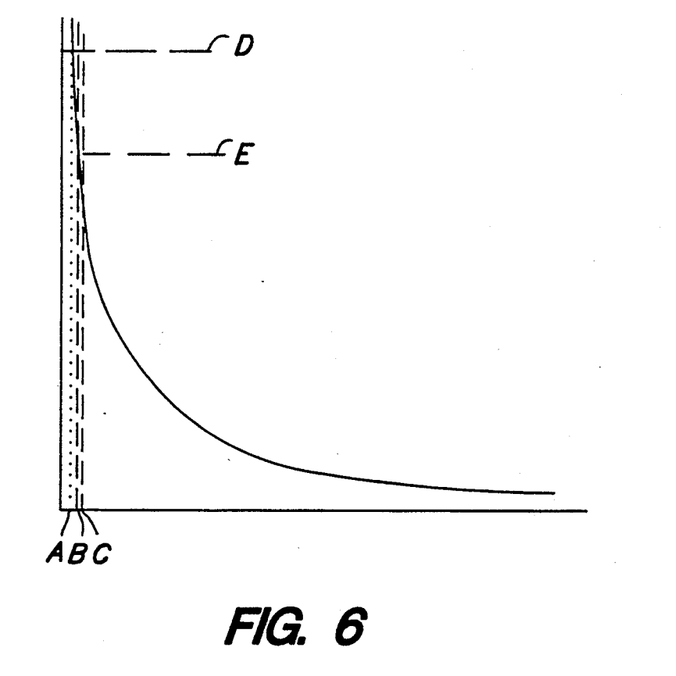
FIG. 6 is a graph which generally represents the capacitance value measured as a function of the spacing between the probe sensor and the workpiece surface, further indicating a representative stand-off band thereon.

FIG. 6 is a graph which generally represents the capacitance value measured as a function of the spacing between the probe sensor and the workpiece surface. As can be seen, when there is a considerable distance between the probe sensor and the workpiece, as depicted by the right-hand side of the graph, the measured capacitance will be relatively small, and will not increase significantly as the spacing distance is reduced. Nevertheless, there is a difference which can be measured and utilized to guide the probe towards the workpiece; i.e., in the direction of increasing capacitance, if such a control is desired. As the distance between the probe sensor and the workpiece gets progressively smaller, there will be a progressively increasing capacitance, so that very significant changes in capacitance will result from relatively minor changes in the spacing. It is generally known, however, that at some point short of direct contact between the two plates of a capacitor; i.e., between the sensor and the workpiece in this case, there will a break-down of capacitance as a result of ionization of the air therebetween, which will short-out the connection. This break-down point will vary depending on the voltage applied between the capacitor elements and other factors such as temperature and contaminants in the air. This break-down point is shown it the graph by dotted line A.

As previously noted, prior art measuring techniques utilizing capacitor sensors, have sought to maintain the probe sensor at, or move the probe sensor to, a specific null point position somewhat short of the break-down point, as defined by a specified capacitance reading, and then adding or subtracting this stand-off distance to the distance measured. It was also previously noted that one of the features of this invention resides in the use of a stand-off band rather than a specific null point, for the purpose of permitting real time controls. An example stand-off band is represented by the two dashed lines B and C in FIG. 6. The end of the band nearest to the workpiece; i.e., line B, should of course be greater than the break-down point so that meaningful capacitance values can be determined. The other end of the band will be determined by the degree of sensitivity and resolution necessary for any particular measurement application. Obviously, the further away from the workpiece surface this limit is, the less sensitive the sensor will be to the capacitance measurement. As can be seen in FIG. 6, the capacitance line close to the workpiece is rather steep, so that the stand-off band B to C, while quite narrow, represents a rather broad range of capacitance as represented by lines D and E.

As an example of the magnitude of the stand-off band, it has been found that when utilizing an applied voltage of 12 volts DC, a minimum spacing of about 0.0001 inch, (0.0025 mm) is ideal to avoid to close an approach where break-down would present false readings. Since a state of the art co-ordinate measuring machine has an accuracy within 0.00025 mm (0.00001 inch), it has been found that this accuracy can be maintained at a stand-off distances up to 0.025 mm (0.001 inch). Accordingly, to maintain the accuracy of 0.00025 mm capability of the co-ordinate measuring machine, a good practical stand-off band should be 0.0025-0.025 mm (0.0001-0.001 inch) when applying a DC voltage of 12 volts. As can be seen, this represents a rather broad stand-off band, with the maximum value being ten times the minimum value. If tolerances less than 0.00025 mm are acceptable, then the sensitivity band can be broadened even further which will permit somewhat higher speed operations.

Figure 7:
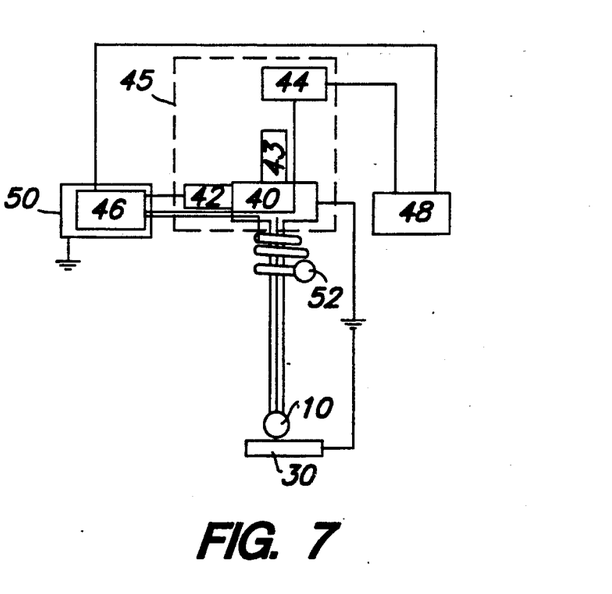
FIG. 7 is a schematic block diagram representative of the apparatus of this invention.

Reference to FIG. 7 will schematically illustrate the apparatus of this invention showing the sensor 10 in close proximity to workpiece surface 30. The probe is secured to the head 40 of a conventional co-ordinate measuring machine 45 which includes drive means 42 and 43 for driving head 40 in two or three co-ordinate axes. The co-ordinate measuring machine 45 also included a position recorder 44 which continuously records the position of sensor 10 thus providing a plot of the sensor's path of travel. A processor-controller 46 is also included within a closed loop feed back with the probe which continuously monitors and records the dynamic capacitance value between the sensor 10 and workpiece surface 30. The processor-controller 46 then controls the motion of the sensor 10 responsive to the capacitance value received, by controlling drive means 42 and 43. In addition, a processor-computer 48 is also provided to determine the sought after surface parameter of the workpiece by receiving data regarding the sensor's recorded path of travel form position recorder 44, and the recorded capacitance corresponding thereto. The processor-computer calculates the workpiece parameters by correcting the probe path of travel to account for the stand-off distance as indicated by the correlated capacitance values. The processor-controller 46 and the processor-computer 48 are, of course, any suitable analog or digital control means which can be programmed to achieve their functions. Such controls are well known in the art and need not be further described here.

As an example of this invention's simple proximity sensing capability, the first step in any measurement operation after the workpiece is mounted may normally be to drive the probe to the center of the nearest workpiece surface and position itself in a predetermined spaced relationship; i.e., stand-off distance or within a stand-off band, from the center of the workpiece surface. As position is effected, the proximity regime will have performed its function; i.e., of guiding, slowing and limiting the approach mechanism to a predetermined point or band adjacent to the workpiece surface. From that point forward, different techniques and algorithms are then employed to achieve any one of the other measurement capabilities of the system.

Additional parameters to be measured and determined may include any one or more dimensions of a surface or cavity, shape, surface contour and the like. While there is a great body of prior art relating to each of these functions, it is an advantage of the present invention that each of these functions can be effectively performed far more rapidly, and even "on the fly," to provide real time process controls with a very high degree of accuracy and reproducibility.

The determination of an interior surface dimension, such as a gap between two opposed workpiece surfaces for example, can be done by proximity sensing techniques whereby the probe is programmed to traverse the distance between the two opposed workpiece surfaces and stopping the motion when a predetermined capacitance is reached, substantially as taught in U.S. Pat. No. 4,816,744, noted above. The actual distance calibrated will be equal to the distance traveled by the probe (as measured by the coordinate measuring machine) plus two times the stand-off distance; i.e., the distance the probe center is spaced from the workpiece surface at each stop position.

Contrary to the technique taught in the noted patent, however, the process of this invention would include at least one real time process control in that the velocity of the probe movement would be an inverse function of the measured capacitance. Specifically, an algorithm would be programmed into the processor-controller so that the velocity of the probe as it traverses between the two surfaces is not constant, but rather an inverse function of the capacitance being measured. As the probe moves away from one workpiece surface, its velocity will progressively increase, and reaches maximum velocity at the mid-point between the two surfaces. As the probe approaches the other workpiece surface, its velocity will decrease in proportion to the increasing capacitance measured, with a slow rate of deceleration at first, and a progressively increasing rate of deceleration as the probe nears the workpiece surface and is eventually stopped at a given null point or within a given stand-off band from the approaching surface. In this way, real time controls are readily effected by rapidly advancing the probe position during a period when close controls are not necessary, and progressively slowing the probe movement as approach to the surface narrows to direct the approach with a high degree of precision and resolution.

It should be appreciated that the drive means for moving the probe may have certain velocity limitations, so that the probe velocity may be subject to a maximum limit, regardless of the capacitance reading. Such a limitation, however, will not significantly affect the beneficial real time control benefits achieved with the practice of this invention.

As another real time process control in the above described measurement, it is not essential that the start and end positions of the probe be fixed at a given null point, but rather be located within a predetermined band of preferred sensitivity. Hence, it becomes unnecessary to take the time to carefully position the probe at an exacting null point starting position, and take the time necessary to bring the probe to a stop and adjusting or stepping it to an exacting null point end position. Pursuant to this other technique of this invention, the probe is moved from any given stand-off position within a stand-off band as described above, and driven at an optimum velocity towards the opposed surface. As the measured capacitance increases as a result of the probe's nearing the opposed surface, the velocity is decreased in proportion thereto, and stopped at any stand-off distance within the stand-off band. The distance between the two opposed surfaces will therefore be the sum of the distance traveled by the probe plus the two stand-off distances. Contrary to prior art practices, this stand-off is not a predetermined fixed position, but one that will have to be calculated by the processor-computer as a function of the capacitance. It should be apparent, however, that the processor-computer can perform this calculation far more rapidly that it would take to zero-in the probe at the two exacting null point positions. By this technique, two real time process controls are employed.

As a third real time process control, the direction of probe movement can also be made to be a function of the measured capacitance. Specifically, the probe can be programmed to move in a line perpendicular to the workpiece surfaces it is receding from or moving towards, by relying on the probe's proximity sensing capabilities. This is effected by programming the probe movement in a direction to maximize capacitance reduction or increase. For example, the probe is first moved in a direction of maximum reducing capacitance as it moves away from the first surface, and when moving towards the opposed surface, to move in a direction of maximum increasing capacitance. In this way the probe movement is made to move in a line perpendicular to the respective workpiece surfaces which is perpendicular to either one or both surfaces, regardless of the orientation of the workpiece mounting on the stationary support. Therefore, careful orientation of the workpiece on the workpiece support relative to the co-ordinates of the moving head is not essential, and therefore, further real time advantages can be achieved.

In measuring the diameter of a bore, for example, similar techniques can be applied except that it is not necessary to move the probe in a line perpendicular to the bore surfaces, or through the diameter center, as taught in U.S. Pat. No. 4,816,744, noted above. With suitable data processing control, all the operator needs to do is to establish three contact points on the bore perimeter. The bore parameters can readily be determined from those three points. For more exacting determination of bore diameter and a determination of accuracy of the bore to specifications, more than three contact points can be determined and calibrated. In such a measurement, however, the probe velocity and stand-off band techniques can be incorporated to provide real time process controls, which will readily define the circumference of the bore.

To determine the distance between two parallel outside surfaces, substantially the same procedure can performed with some differences. According to one technique similar to that practiced with prior art co-ordinate measuring machines, the probe is positioned adjacent to one surface and its co-ordinate position determined. Then the probe is positioned adjacent to the opposed surface at a point directly opposed from the first position and its co-ordinate position again recorded. The distance can readily be determined to be spacing between the two co-ordinate axis positions, less the two stand-off distances. As noted, the stand-off distances can quickly be determined by the capacitance value there measured. Pursuant to this invention, the above technique can be significantly quickened by any one or more of the real time controls of this invention. For example, the probe movement from one surface to the other can be moved at optimum velocity, and the probe position adjacent to the workpiece surfaces need not be stopped at any predefined stand-off position, but within a stand-off band.

The proximity sensing capabilities of the process of this invention, however, will provide techniques for determining outside measurement far superior to the technique described above, which cannot be utilized with prior art contact probes. By virtue of the probe's proximity sensing capabilities, it can measure an outside dimension by a procedure similar to that used to measure an inside dimension, by moving the probe along the surface to be measured from one outside edge to the other, while measuring the capacitance between the probe and the adjacent surface, and controlling the motion of the probe in response to the capacitance measurement. By proper pre-calibration of the capacitance value when the probe is positioned directly over the edge of the workpiece, as depicted in FIG. 6, the end-point can be readily determined and the probe started at one end-point and moved to the other. Hence, the outside dimension is determined to be the distance traveled from end-point to end-point, without the need for any off-set correction.

Real time controls can be incorporated into the above technique as well by controlling the probe velocity in direct proportion to the capacitance measured. Near the mid portions of the workpiece, where the measured capacitance is at or near its maximum value, the probe velocity is at or near its maximum velocity. As the probe approaches an edge of the workpiece, the capacitance is reduced in proportion to the proximity of the edge. Therefore, the probe motion is automatically slowed in proportion to the decreasing capacitance and stopped at the proper end-point, as indicated by the capacitance measured. The dimension of the outside surface is then readily determined to be the distance traveled by the probe, as indicated by the co-ordinate measuring machine, without the need for any corrections.

A significant advantage of the above-described technique, it the ability to move the probe rather rapidly in a lateral direction along the workpiece surface, in a surface tracing mode, as previously described. To effect such a motion by prior art techniques would require that the probe be moved laterally in minute increments, with each increment followed by a adjusting the probe perpendicularly to the null point distance, a very time consuming procedure. According to this invention, however, the probe is moved laterally, within a set-off band, in an uninterrupted, continuous motion, with only periodic corrections in direction to keep the motion within the band. By incorporating the velocity control concept of this invention, that motion in not only uninterrupted, but proceeds at the optimum velocity possible, consistent with the control necessary to prevent the probe from overriding the workpiece edge.

Figure 8:
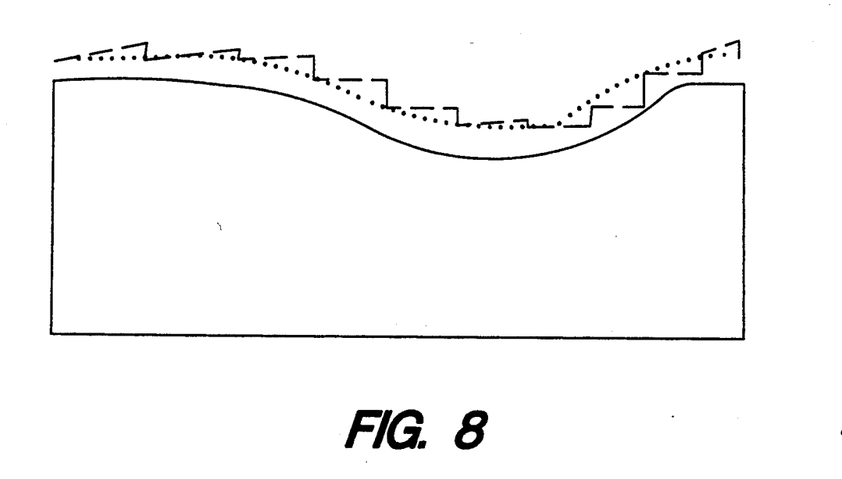
FIG. 8 is a schematic plot of a capacitance probe path of movement in tracing a workpiece surface pursuant to prior art techniques.
Figure 9:
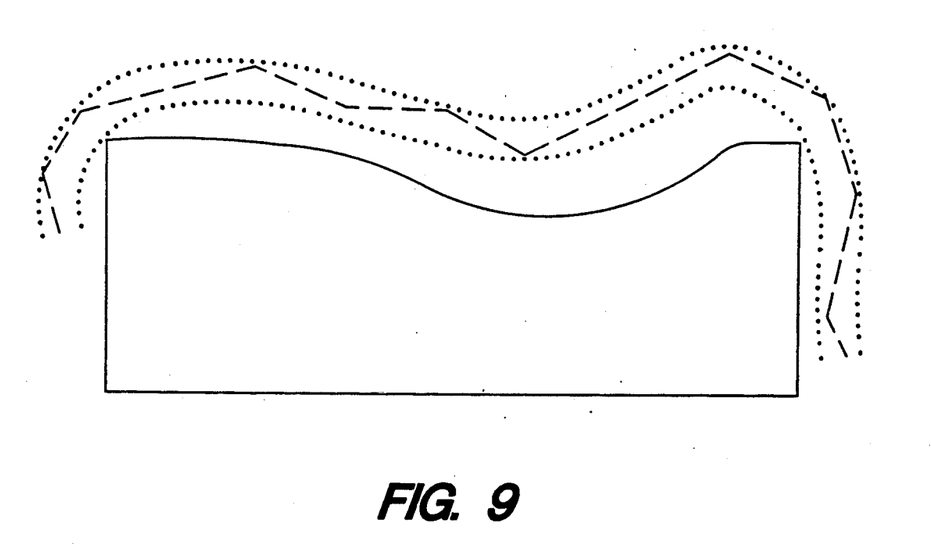
FIG. 9 is a schematic plot of a capacitance probe path of movement in tracing a workpiece surface pursuant to this invention.

FIGS. 8 and 9 are presented for the purpose of graphically illustrating the motion path within a stand-off band according to this invention, as contrasted to path of motion according to prior art practices. The respective motion paths are depicted by the dotted lines, while the null point line as well as the stand-off band are depicted by dashed lines. The width of the stand-off band and the changes in direction are exaggerated in the figures for the purpose of making minute variations visible. As can be seen in FIG. 8, the prior art technique requires a large number of minute incremental lateral motion, each of which is followed by one or more stepping movements to bring the probe to a null point where its position is then recorded. As shown in FIG. 9, the process of this invention permits an uninterrupted lateral motion which is only periodically corrected, without stopping, to keep the motion within the band. It should be readily apparent that even without using the velocity maximizing feature of this invention, that the practice of this invention in keeping the probe motion within a band will cause the probe traverse a given distance much more rapidly than possible by prior art techniques.

The use of a stand-off band as described above will provide additional benefits. For example, the surface tracing probe can even be programmed to turn the corner and follow the adjoining surface so that a full workpiece perimeter determination can be measured, all in a single set-up. To effect such a turning action, the controls are programmed to slow the lateral motion of the probe as it approaches a corner as depicted in FIG. 9. When it reaches the corner the measured capacitance will drop-off significantly due to a reduced capacitance from the forward side of the probe. As a result of this, the stand-off band will naturally be drawn closer to the workpiece corner as depicted in FIG. 9. Nevertheless, the adjoining surface will also be capable of effecting a capacitance, for which a like stand-off band will also be applicable. Therefore, as the probe motion reaches a workpiece corner, the measured capacitance will naturally diminish as a result of the diminishing capacitance at the forward side of the sensor. This will cause the processor-controller to "think" the probe is moving away from the workpiece surface and, therefore, bring the probe closer to the workpiece corner. Due to the minimum limit of the band, however, the sensor will not contact the workpiece corner, but rather pivot around the corner as necessary to keep moving within the limits of the stand-off capacitance. Accordingly, the probe's motion within the stand-off band will cause it to move from the end spot of one surface to the end spot of the adjacent surface, thereby continuing to follow or trace the adjoining surface, substantially as depicted in FIG. 9. Thereafter, the probe moves within the stand-off band adjacent to the new surface, again from one corner to the next and so on, until the workpiece has been completely encircled.

Utilization of a stand-off band will be particularly advantageous in measuring the perimeter of a workpiece as described above. By this technique, the probe can be made to circumscribe the workpiece within stand-off band at an advantageous probe velocity, since the probe would not have to stop at an end point adjacent to any outside corner, but would merely need to be slowed down to make the turn. The perimeter dimensions of the workpiece can readily be determined by the path taken by the probe, as defined by the coordinate measuring machine, and corrected by subtracting the space between the probe and workpiece as defined by the capacitance profile. In a like manner, an inside perimeter could be measured.

To determine surface profile, either of two procedures can be utilized, one ideally suited for plotting a macro surface profile change such as the contour of a turbine blade or the perimeter of a cylinder, and the other ideally suited for plotting a micro surface profile, such as the face of a coin. The macro profile technique is substantially the same as that described above for measuring the perimeter of a workpiece. Specifically, the probe is moved in a path to substantially trace the profile of the workpiece within a defined stand-off band, while the probe velocity is controlled as a function of the measured capacitance, substantially as described above. In the micro application, the probe is moved in a straight line generally parallel to the overall workpiece surface while measuring and plotting the variable capacitance. Since high spots will cause an increase in capacitance and low spots a decrease in capacitance, a logarithmic plot of the capacitance values will indicate the linear profile of the workpiece surface. In either one of the two techniques, a plurality of such passes at uniformly spaced parallel lines of travel will permit one to determine and plot the surface contour in three-dimensions.

To take full advantage of the high degree of sensitivity and resolution of the capacitance probe of this invention, it has been found to be essential to correct all capacitance measurements to the actual capacitance of the coupling; i.e. the capacitance between the sensor and the workpiece, and eliminate any capacitance effected by environmental influences such as temperature, atmosphere, humidity, and external noise such as electromagnetic interference and radio frequency interference. It has been found that adequate corrective measures can be achieved by providing two corrective means, as are illustrated in FIG. 7. First, the processor-controller must be shielded from environmental influences. This can be effected by physically shielding the circuitry within a controlled environment, as for example, placing the circuitry within a grounded conductive container 50, which will shield circuitry from external noise, external contaminants such as dirt, humidity and external capacitance influences. While the interior of the container 50 can be maintained at a constant temperature and humidity for ultimate accuracy, it has been found to be adequate if the circuitry is merely protected by a good thermal insulator. Since metal is not normally a good thermal insulator, and good thermal insulators are not normally good for noise shielding, and ideal solution has been to wrap the circuitry in a grounded metal foil, and housing the wrapped circuitry in a good thermal insulating container, such as nylon.

As a second corrective step, the probe sensor itself must be corrected to account for environmental capacitance. For example, temperature changes will cause minute changes in the overall capacitance sensed by the sensor, as will the proximity of conductive bodies such as structural members of the co-ordinate measuring machine itself. To correct this capacitance reading, a second probe, namely an environmental probe, is provided in the vicinity of the main probe, but displaced sufficiently from the workpiece that it is not influenced significantly by the workpiece. In this way, this environmental probe will measure capacitance as is primarily effected by environmental influences. To determine the actual capacitance between the main probe sensor and the workpiece, the environmental capacitance recorded by the environmental probe must be subtracted from the capacitance recorded by the main probe. While a separate data processor could be utilized to achieve this simple calculation, this added task can be performed by the processor-controller 46 by simply reading and recording the measured capacitance to be that value as measured by the primary probe less that value measured by the environmental probe.

Reference to FIG. 7 will illustrate one such successful environmental probe 52 which comprises a helically wound stylus having a sensor at the end, and disposed around stylus tube 12, just below the point where the stylus tube 12 is joined to the head of the co-ordinate measuring machine. It is essential, of course, that the environment effect an identical capacitance on each probes, so that the capacitance subtracted is equal to the environmental capacitance effected. Therefore, the physical parameters of the environmental prove 52 should be substantially the same as the main probe. Excellent results have been achieved by using an environmental probe which is identical to the main probe in so far as materials, fabrication and dimensions are concerned, with the only difference being that the stylus tube of the environmental probe is wound in a helical configuration and mounted as shown if FIG. 7.

In view of the above description, it should be readily apparent that the process and apparatus of this invention will provide very useful techniques for measuring various workpiece parameters with significant real time process controls which cannot be achieved by any prior art technique.

We claim:

1. A method for measuring surface characteristics which comprise dimensions and contour of a conductive workpiece utilizing a non-contacting, conductive probe sensor, the steps comprising;
    a) applying a voltage across said workpiece and said sensor,
    b) causing a relative motion between said sensor and said workpiece so that said sensor defines a path of travel with reference to said workpiece by which said sensor is moved generally parallel to a first workpiece surface at a velocity dependent upon the measured capacitance so that said velocity is increased when the capacitance indicates that the sensor is in no danger of impacting with or moving past the workpiece, and said velocity is reduced in proportion to capacitance changes indicating that the sensor is approaching a second workpiece surface intersecting with said first workpiece surface,
    c) measuring and recording said path of travel,
    d) measuring and recording the capacitance between said sensor and said workpiece relative to said path of travel,
    e) determining the surface parameters of the workpiece as a function of the said recorded path of travel and the corresponding recorded capacitance.

2. A method according to claim 1 in which a parameter of the sensor relative motion selected from one of the group consisting of velocity, and direction within a stand-off band adjacent to said workpiece surface and both, is a function of the measured capacitance.

3. A method according to claim 1 in which said sensor is moved at a velocity dependent upon the measured capacitance so that said velocity is increased when the capacitance indicates that the sensor is in no danger of impacting with or moving past the workpiece, and said velocity is reduced in proportion to capacitance changes indicating that the sensor is approaching changes in the characteristics of the adjacent workpiece surface where said sensor is approaching a condition for impacting with or moving past the workpiece.

4. A method according to claim 1 in which the sensor relative motion is halted before the sensor can contact said second workpiece surface.

5. A method according to claim 1 in which the sensor direction of motion is changed before the sensor can contact or move beyond said second workpiece surface, and thereafter move generally parallel to said second workpiece surface.

6. A method according to claim 1 in which said sensor is moved in a continuous, uninterrupted motion generally parallel to said workpiece surface while said measured capacitance controls the direction of motion to keep the sensor motion within a given stand-off band spaced from the workpiece surface until the desired measurement is completed.

7. A method according to claim 6 in which said stand-off band represents a band of acceptable sensitivity so that the distance between the sensor and workpiece surface can be determined by the capacitance within an acceptable degree of accuracy.

8. A method according to claim 1 further including the steps of continually measuring the capacitance effected by environmental conditions and correcting the measured and record capacitance between the sensor and workpiece by deleting the environmental capacitance effect.

9. A method according to claim 1 further including the steps of shielding said processor-controller from environmental interference of temperature, dust, electromagnetic interference and radio frequency interference.

10. A method according to claim 9 in which said shielding comprises wrapping said processor-controller in a grounded conductive metal and housing the wrapped processor-controller in a non-metallic thermal housing.

11. Apparatus for measuring surface characteristics which comprise dimensions and contour of a conductive workpiece comprising;
 a) a capacitance probe having a conductive sensor,
 b) means for applying a voltage across said conductive sensor and said workpiece,
 c) drive means for causing a relative motion between said sensor and said workpiece so that said sensor will define a path of travel by which said sensor is moved generally parallel to a first workpiece surface at a velocity dependent upon the measured capacitance so that said velocity is increased when the capacitance indicates that the sensor is in no danger of impacting with or moving past the workpiece, and said velocity is reduced in proportion to capacitance changes indicating that the sensor is approaching a second workpiece surface intersecting with said first workpiece surface,
 d) means for measuring and recording said path of travel,
 e) means for measuring and recording the capacitance between said sensor and workpiece with respect to said path of travel,
 f) means for calculating the parameters of the workpiece surface as a function of the recorded path of travel and the recorded capacitance corresponding thereto.

12. Apparatus according to claim 11 further including means for controlling said drive means for moving said sensor in response to the measured capacitance so that a parameter of the sensor motion selected from one of the group consisting of velocity, direction within a stand-off band adjacent to said workpiece, and both, is a function of the measured capacitance.

13. Apparatus according to claim 11 in which said means for moving said sensor and said means for means for continuously measuring and recording the position of said sensor comprise a co-ordinate measuring machine.

14. Apparatus according to claim 11 further including a means for continually measuring the capacitance effected by environmental conditions and correcting the measured and record capacitance between the sensor and workpiece by deleting the environmental capacitance effect.

15. Apparatus according to claim 14 wherein said means for continually measuring the capacitance effected by environmental conditions comprises an environmental probe substantially similar to said capacitance probe.

16. Apparatus according to claim 14 wherein said environmental probe is positioned in the vicinity of said capacitance probe but adequately spaced from said workpiece to avoid significant capacitance measurements with regard to said workpiece.

17. Apparatus according to claim 14 wherein said means for continually measuring the capacitance effected by environmental conditions and correcting the measured and recorded capacitance between the sensor and workpiece by deleting the environmental capacitance effect comprises said processor-controller.

18. Apparatus according to claim 11 further including a means for shielding said processor-controller from environmental interference of temperature, dust, electromagnetic interference and radio frequency interference.

19. Apparatus according to claim 18 wherein said means for shielding said processor-controller from environmental interference of temperature, dust, electromagnetic interference and radio frequency interference comprises wrapping said process-controller in grounded conductive foil disposed within a thermal insulating container.

* * * * *